UNITED STATES PATENT OFFICE.

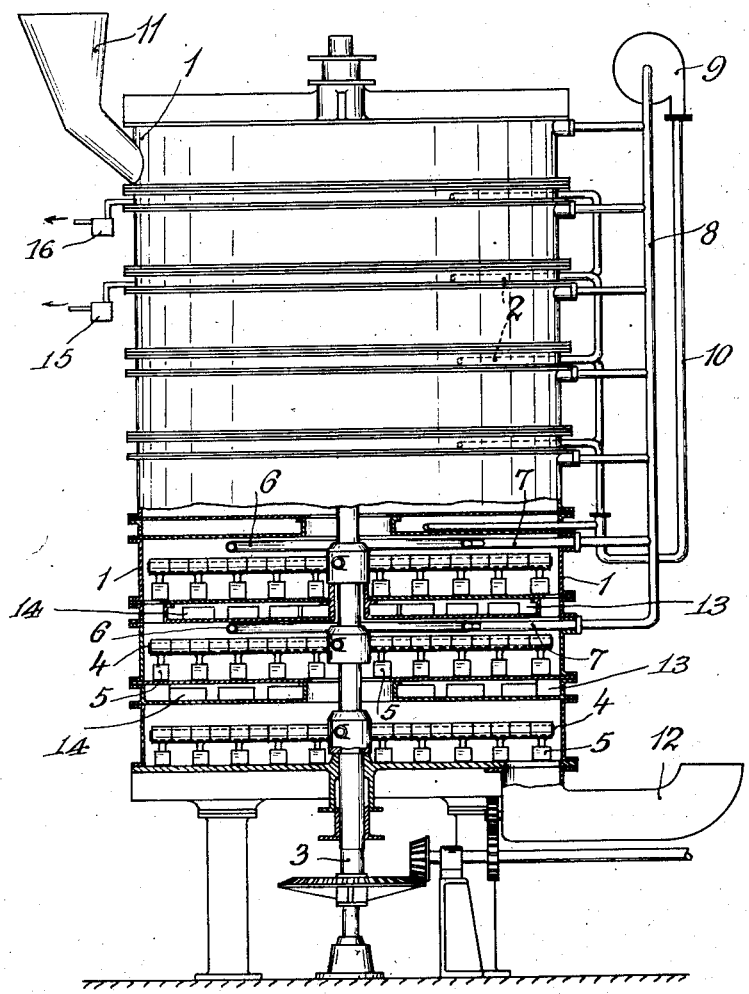

GUNNAR SCHJELDERUP, OF CHRISTIANSAND, NORWAY.

APPARATUS FOR DRYING MATERIAL CONTAINING LIQUID.

1,391,510.  Specification of Letters Patent.  Patented Sept. 20, 1921.

Application filed March 1, 1920. Serial No. 362,584.

*To all whom it may concern:*

Be it known that I, GUNNAR SCHJELDERUP, a subject of the King of Norway, residing at Christiansand, Norway, have invented certain new and useful Improvements in Apparatus for Drying Material Containing Liquid, (for which I have filed an application in Norway, #15,791, Feb. 24, 1919;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The drying on an industrial scale of solid material containing liquid requires considerable energy. This particularly is the case where the liquid can not be removed by means of filtration or other known mechanical methods. In cases where waste heat is not available for the purpose fuel or other energy has to be used so that the drying process even with modern machinery is too expensive to be carried out on an economical scale. The above mentioned effects are particularly important in connection with ore concentrates produced by any of the known flotation processes, and in which the amount of water in most cases can not be reduced to less than 20%. The transportation of the concentrate in this condition is difficult and expensive, and the removal of the water requires a great amount of heat in the metallurgical treatment.

The present invention has for its object a process by means of which the drying may be carried out by means of a small part of the energy required in the previously known methods.

The invention consists therein that the vapors formed by the drying process are compressed without being mixed with air and are conducted in compressed condition to condensers on the surface of which the solid material to be dried is placed in thin layers. The vapor transfers its condensing heat through the walls of the condensers to the material to be dried. The evaporating or drying chamber and the condensing chamber are both air-tight and are interconnected by the medium of the compressor, the pressure conduit of which is connected with the closed condensing chamber, while the suction conduit is connected with the evaporating chamber, which is separated from the outside by means of suitable feeding and discharging devices for the material to be dried. It has been found to be advisable to preheat the drying material before introducing the same into the evaporating chamber in order to prevent the vapors which are present in the evaporating chamber from condensing on the drying material. For this the hot condensed liquid may partly be used.

The process above described may be practically carried out in different ways. The drying material may be brought in direct contact with the surface of the condenser along which it is fed by means of suitable mechanical means. A number of condensers may suitably be arranged as superposed floors in a drying apparatus, the material being fed from one floor to the other in counter movement to the compressed steam. For the efficiency of the apparatus it is of great importance that the material be distributed as evenly as possible on the floors, and that the layer of material be made sufficiently thin in proportion to its conductivity of heat.

According to the present process the material to be dried is not exposed to the influence of atmospheric air whereby all oxidation is avoided. Further the losses owing to the formation of dust in the usual drying processes are completely avoided according to the present method, as the evaporating chambers are not exposed to other gases than the gases or vapors developed by the material to be dried, so that the velocity of the gas or vapor currents in the chambers is generally low. The process makes it possible to extract the total amount of liquid and gases contained in the material, which may be of importance for regenerating chemical products and in cases where the gases developed may be utilized separately.

The invention comprises an apparatus for continual drying similar to a roasting furnace with superposed floors, the floors of the apparatus being constructed as condensers for the compressed vapors, the drying material being fed continuously through the superposed drying chambers of the apparatus.

A form of an apparatus of this kind is diagrammatically illustrated on the drawing in a partly sectional side view.

The apparatus consists of a plurality of superposed chambers 1, 2, the chambers 1 serving as drying chambers and the chambers 2 serving as condensing chambers.

Each chamber is made in the form of a hollow disk and the disks are adapted to be secured together on top of each other in the desired number.

A shaft 3 runs centrally through all the disks and is provided in the drying chamber with radially projecting scraper arms 4 carrying scrapers 5, which run along the floors of the drying chambers 1, each drying chamber is connected by means of a perforated annular tube 6 and outlet pipe 7 with a tube 8 leading to the suction opening of a compressor 9.

The condensing chambers are connected by means of pipe conduits 10 with the pressure side of the compressor 9.

The two uppermost chambers 2 are provided with outlets 15 and 16 for condensate. At the top of the lowermost drying chambers are closed chambers 13, provided with heating units 14.

The material to be dried is introduced in the usual manner through a feeding device 11 on the floor of the uppermost drying chamber 1 and is fed continuously from one floor to another by means of the scrapers, like the charge of a roasting furnace, being dropped from one floor to the next alternately through openings near the center and through openings near the circumference of the circular floors. Finally the dried goods are discharged through the discharging device 12.

Claims:

1. A drying apparatus, comprising superposed drying chambers communicating alternately at the center and sides, a central shaft, scrapers thereon in the drying chambers to move the material to be dried over the floors of said chambers, heat transmitting chambers between the adjacent drying chambers, means to withdraw vapors from the drying chambers, compress them and discharge the compressed vapors into some heating chambers and means to heat others of said chambers independently.

2. A drying apparatus comprising superposed drying chambers communicating alternately at the center and sides, a central shaft, scrapers thereon in the drying chambers, heating chambers interposed between the drying chambers, means to withdraw the vapors from the drying chambers, to compress them and to discharge them into the heating chambers connected in series.

3. A drying apparatus, comprising drying chambers having hollow floors serving as heating chambers, means to withdraw and compress the vapors arising in the drying chambers and discharge them into the heating chambers.

In testimony that I claim the foregoing as my invention, I have signed my name in presence of two subscribing witnesses.

GUNNAR SCHJELDERUP.

Witnesses:
 NATH. A. HEDENOCKON,
 E. S. HENDRICKSEN.